United States Patent [19]
Fenton

[11] Patent Number: 5,575,491
[45] Date of Patent: Nov. 19, 1996

[54] CARRIER HITCH

[75] Inventor: E. Dale Fenton, Columbia, Mo.

[73] Assignee: ASI Industries, Fulton, Mo.

[21] Appl. No.: 431,643

[22] Filed: May 2, 1995

[51] Int. Cl.$^6$ .................................................. B60D 1/52
[52] U.S. Cl. .................................. 280/417.1; 280/423.1; 280/511
[58] Field of Search ........................... 280/405.1, 406.1, 280/407, 407.1, 415.1, 416.1, 417.1, 423.1, 495, 500, 502, 504, 511

[56] References Cited

U.S. PATENT DOCUMENTS

| | | | |
|---|---|---|---|
| 2,772,893 | 12/1956 | Wettstein | 280/406.2 |
| 2,828,143 | 3/1958 | Da Vatz | 280/406.2 |
| 3,164,398 | 1/1965 | Lugash | 280/423.1 |
| 3,164,399 | 1/1965 | Lugash | 280/416.1 X |
| 4,527,935 | 7/1985 | Fortenberry | 280/415.1 X |
| 4,832,359 | 5/1989 | Rafi-Zadeh | 280/423.1 |
| 4,921,266 | 5/1990 | Beals | 280/417.1 |
| 5,344,172 | 9/1994 | Jaun | 280/415.1 |

Primary Examiner—Brian L. Johnson
Assistant Examiner—Victor E. Johnson
Attorney, Agent, or Firm—Trexler, Bushnell, Giangiorgi & Blackstone, Ltd.

[57] ABSTRACT

A novel carrier hitch is provided for attaching a heavy trailer or the like to a pick-up truck or the like. The hitch can be quickly and easily attached to and detached from the truck without any residual damage to the truck. The hitch includes first and second main beam which are connected at a first end of each beam. A cross member is connected between the main beams at approximately the middle of the beams to form an A-shaped frame structure. A frame mounting member is connected between the main beams at generally a second end of each of the beams. An attachment structure is attached to the hitch for removably attaching the hitch to the truck frame. A connecting structure is attached to the cross member for releasably connecting the trailer to the hitch. A post member extends downwardly from the joined ends of the main beams and is connected to the underside of the truck. When the hitch is attached to the truck frame and a trailer attached thereto, the cross member, and thus the connecting structure, is generally positioned over or slightly forward of the rear axle of truck so that the weight of the trailer is evenly distributed over the truck frame.

12 Claims, 3 Drawing Sheets

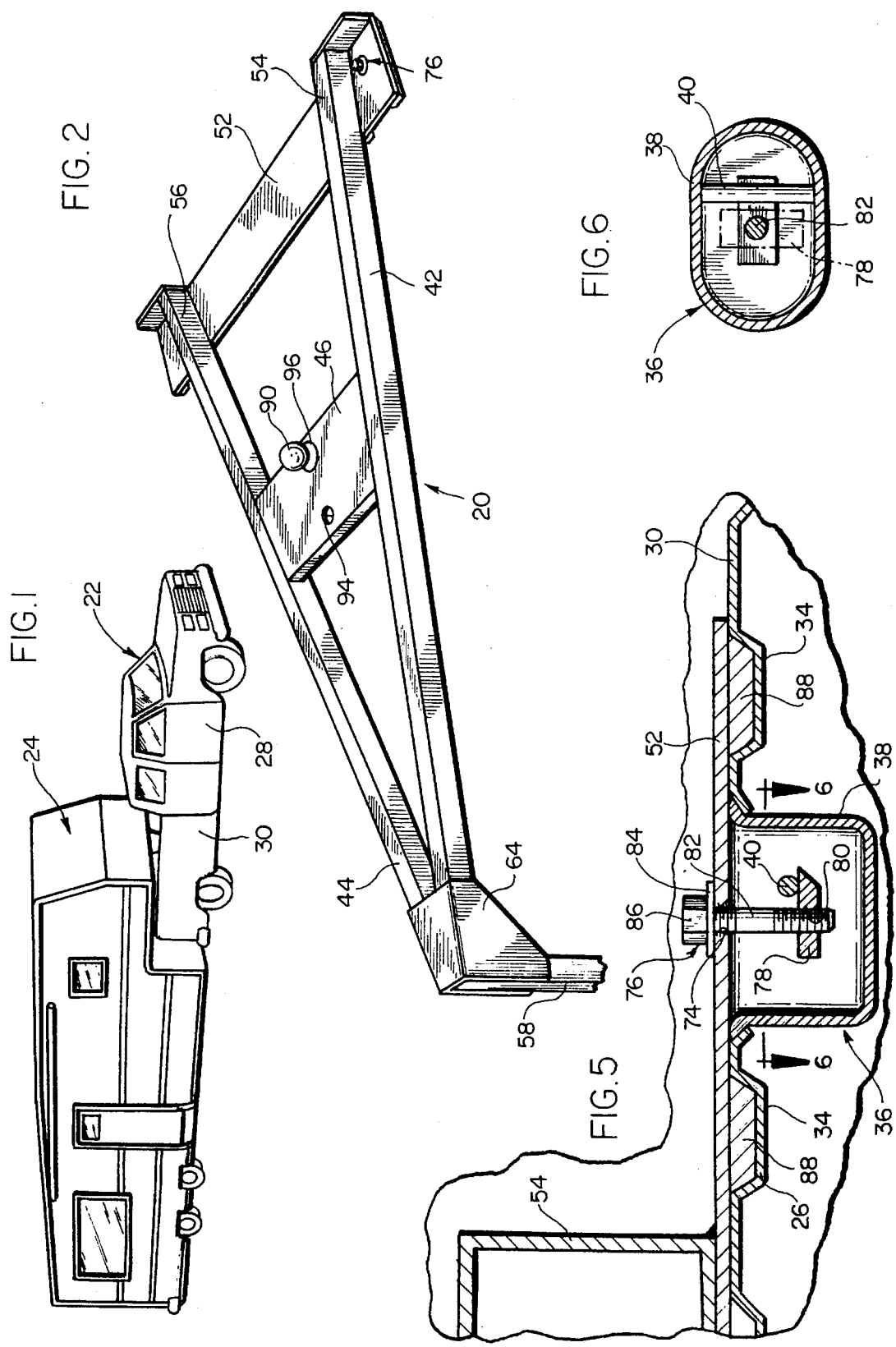

CARRIER HITCH

BACKGROUND OF THE INVENTION

This invention is generally directed to an improved carrier hitch for hitching a heavy trailer or the like to a pick-up truck or the like. More particularly, the invention contemplates a carrier hitch which can be easily and quickly attached and detached from the truck frame without causing residual damage to the truck frame.

Currently, there are generally two methods chosen for hauling heavy trailers with a pick-up truck. The first method attaches the trailer to a bumper hitch which places the weight of the trailer behind the rear axle of the pick-up truck. This method of attaching a trailer to the pick-up truck often causes the front of the truck to be lifted into the air due to the trailer load moment. As a result, the head lights of the truck often do not aim correctly and can potentially create road hazards by blinding oncoming traffic. The decreased weight on the front end of the pick-up truck also promotes decreased traction which decreases steering and braking potential thereby creating unsafe driving conditions.

When using the second method, a hole is cut into the bed of the pick-up truck. A ball hitch is attached to the frame of the pick-up truck over the drive axle. This method of attaching the hitch potentially exposes the pick-up truck frame to damage during modification by the operator. If damage occurs, the damage often compromises the structural integrity of the truck frame. The hole cut into the bed of the truck usually creates a weak spot in the truck frame and often the cutting procedure yields an unappealing attachment which becomes a permanent fixture of the pick-up truck. Also, this cutting procedure sometimes distorts the wheel alignment of the pick-up truck. The hole in the bed of the pick-up truck also compromises the pick-up truck's ability to carry other types of loads such as particulate matter.

The present invention presents a novel carrier hitch which overcomes or minimizes the problems found in prior art hitches and presents several other improvements and advantages over the prior art.

OBJECTS AND SUMMARY OF THE INVENTION

A general object of the present invention is to provide a novel hitch which is removably attached to a pick-up truck or the like, and which is used to attach a trailer or the like to the truck so that the trailer can be hauled.

An object of the present invention is to provide a novel hitch which optimizes distribution of the trailer weight and load over the truck frame.

Another object of the present invention is to provide a novel hitch which can be easily and quickly attached to and removed from the truck frame without residual damage to the truck frame.

A specific object of the present invention is to provide a hitch which does not potentially compromise the integrity of the truck frame.

Briefly, and in accordance with the foregoing, the present invention discloses a novel carrier hitch for attachment to a pick-up truck or the like so that a trailer or the like can be attached to the truck. The hitch is formed from a frame structure which generally includes a first main beam; a second main beam, a cross member, a frame mounting member and a post member. Each of the beams and members are made of suitable materials, such as steel.

The main beams are connected together at generally a first end of each main beam. The cross member is generally connected between the first and second main beams at approximately the midpoint of the beams. The first and second main beams and the cross member generally form an "A" shape. The frame mounting member is connected between the first and second main beams at generally a second end of each of the beams. The post member is attached to the apex of the "A" shape and extends downwardly therefrom and is connected to the truck frame. When the hitch is attached to the truck frame, the cross member is generally positioned over or slightly ahead of the rear axle of the truck.

An attachment structure is attached to the hitch for removably attaching the hitch to the truck frame without causing residual damage to the truck frame. The attachment structure may be a clamp structure which is connected to the underside of the frame mounting member and clamps onto a suitable structure on the truck frame. The clamp structure can be easily and quickly released from the truck frame so that the hitch can be detached from the truck.

A connecting structure is attached to the hitch for removably connecting the trailer to the hitch so that the truck and the trailer are interconnected by the hitch. The connecting structure, which can be at least one attachment ball, is attached to the cross member. This allows the trailer load to be evenly distributed over the frame of the truck since the cross member is positioned over or slightly ahead of the rear axle of the truck.

The frame mounting member may have rods attached to an underside of the frame mounting member. The rods seat within bed liner grooves, if provided, on the frame of the truck and help to distribute the load of the trailer into the grooves and to prevent distortion of the hitch.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a perspective view of a pick-up truck which is hauling a heavy trailer by use of a carrier hitch which incorporates the features of the invention;

FIG. 2 is a partial, perspective view of the carrier hitch used in FIG. 1;

FIG. 5 is a cross-sectional view along line 5—5 of FIG. 3 of a clamp bracket arrangement which is used to clamp the carrier hitch of the present invention to the bed of the pick-up truck; and FIG. 6 is a cross-sectional view of the clamp bracket arrangement along line 6—6 in FIG. 5.

DETAILED DESCRIPTION OF THE PREFERRED EMBODIMENT

Figure 3:
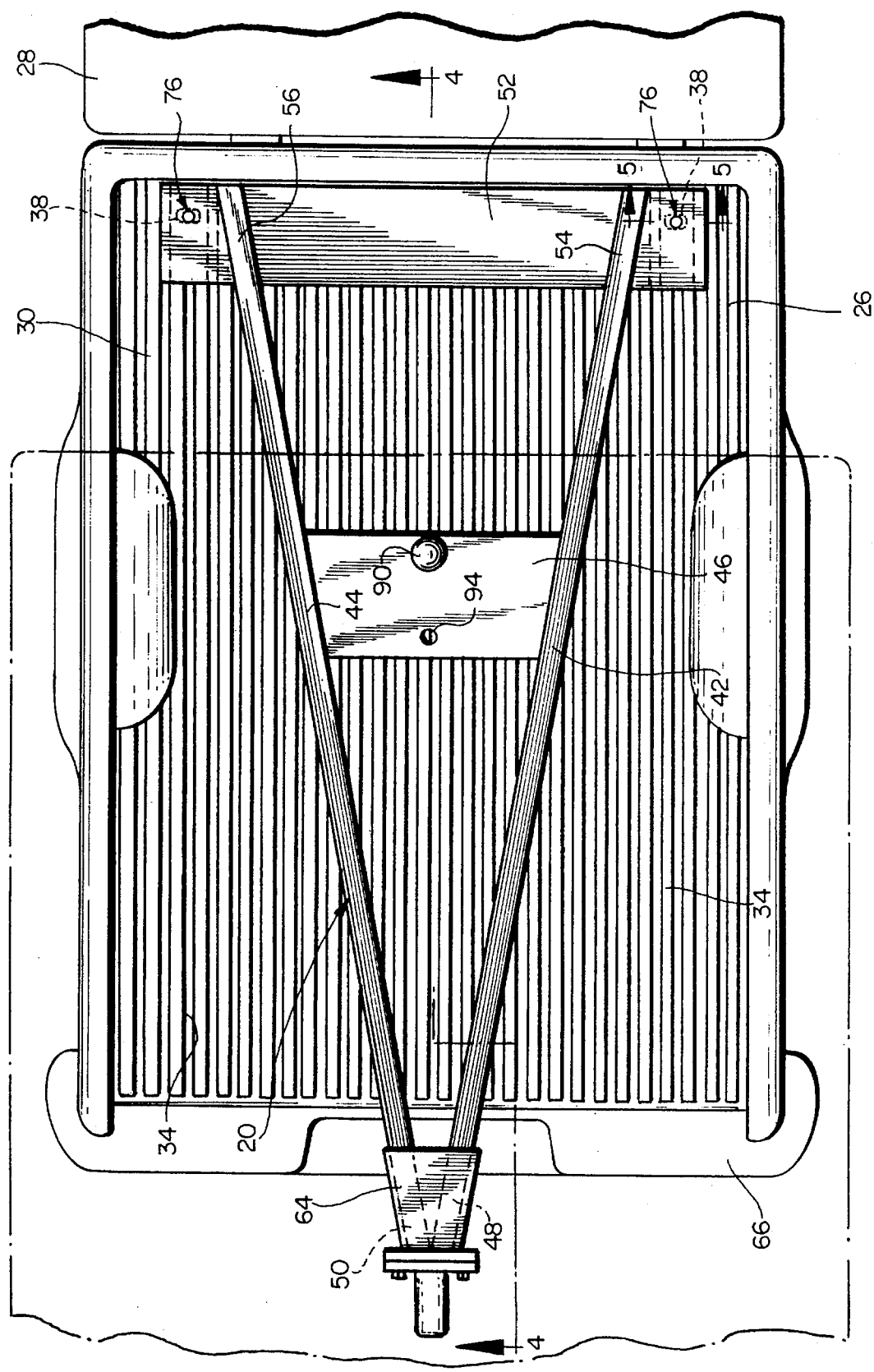
FIG. 3 is a partial, top plan view of the pick-up truck with the trailer detached therefrom and a top plan view of the carrier hitch of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

As shown in the drawings, the present invention discloses a novel carrier hitch 20 which provides an attachment so that a pick-up truck 22 or the like can pull a heavy trailer 22 or the like. The novel carrier hitch 20 provides a fifth wheel or ball type hitch above the drive axle of the pick-up truck 22, in a bolt-on application which makes the hitch 20 easily removable from the truck 22. The hitch 20 carries the trailer load at the hitch point to the front of the truck bed and to the rear of the truck frame. This disperses the trailer load and stress into multiple points that are structurally superior to the traditional location used in the past on pick-up trucks. The carrier hitch 20 of the present invention, however, does not become a permanent fixture of the pick-up truck 22. The carrier hitch 20 can be easily removed by an operator while showing no evidence of a hitch ever existing in the pick-up truck 22.

As shown in FIG. 1, the pick-up truck 22 that the carrier hitch 20 of the present invention is attached to is of a conventional structure, and is not described in detail herein. Briefly, the pick-up truck 22 has a truck frame 26 having a cab portion 28 and a bed 30 which is rearward of the cab portion 28. The truck frame 26 is supported by a front axle and a rear axle 32, each axle having a set of tires attached thereto by suitable means. The frame 26 of the pick-up truck 22 is designed to carry weight. The bed 30 of the pick-up truck 22 may have liner grooves 34 of a conventional structure thereon. The liner grooves 34 generally extend from the front to the back of the bed 30.

Two pockets 36, one of which is shown in detail in FIGS. 5 and 6, may be formed in the bed 30 of the pick-up truck 22 in a forward portion of the bed 30. Each pocket 36 extends downwardly below the plane of the bed 30 of the pick-up truck 22. The pockets 36 can be formed by welding a separate pocket member 38 into the bed 30 of the pick-up truck 22. A bed pin 40 is welded into each pocket member 38 and extends parallel to the length of the bed 30 of the pick-up truck 22. Alternatively, the bed pin 40 can extend perpendicularly to the length of the bed 30. These types of pockets 36 can be found on DODGE® pick-up trucks.

The novel carrier hitch 20 of the present invention generally includes an elongate first main beam 42, an elongate second main beam 44 and an elongate cross member 46. The beams 42, 44 and the cross member 46 are made of a suitable strong material, such as steel or the like. The first and second main beams 42, 44 are attached to each other at a first end 48, 50 of each of the beams 42, 44, respectively, by suitable means, such as by welding the ends 48, 50 of the beams 42, 44 together. As shown in FIG. 3, when the hitch 20 is attached to the truck 22, the joined ends of the main beams 42, 44 lie generally at the midpoint of the rearmost end of the truck 22. The beams 42, 44 extend diagonally from the rear of the truck bed 30 to generally the front of the truck bed 30 and diverge outwardly from each other. The cross member 46 is attached to the main beams 42, 44 at approximately the midpoint of the beams 42, 44 by suitable means, such as by welding, and lies perpendicular to the length of the truck bed 20. Thus, the main beams 42, 44 and the cross member 46 form generally an "A" frame with the joined first ends 48, 50 of the beams 42, 44 defining an apex of the "A" frame.

A frame mounting member 52 is attached to a second end 54, 56 of each of the main beams 42, 44, respectively, and lies perpendicular to the length of the truck bed 20 and thus, parallel to the cross member 46. A downwardly extending post member 58 is attached to the joined ends of the main beams 42, 44, or apex of the "A" frame, at a top end 60 of the post member 58. The post member 58 is perpendicular to the first and second main beams 42, 44. A bottom end 62 of the post member 58 is connected to the underside of the truck frame 26 as described herein. The frame mounting member 52 and the post member 58 are each made of a suitable material, such as steel and the like, and are each attached to the main beams 42, 44 by suitable means, such as by welding. A gusset 64 is connected to both the first and second main beams 42, 44 and the post member 58 to strengthen the hitch structure.

Figure 4:
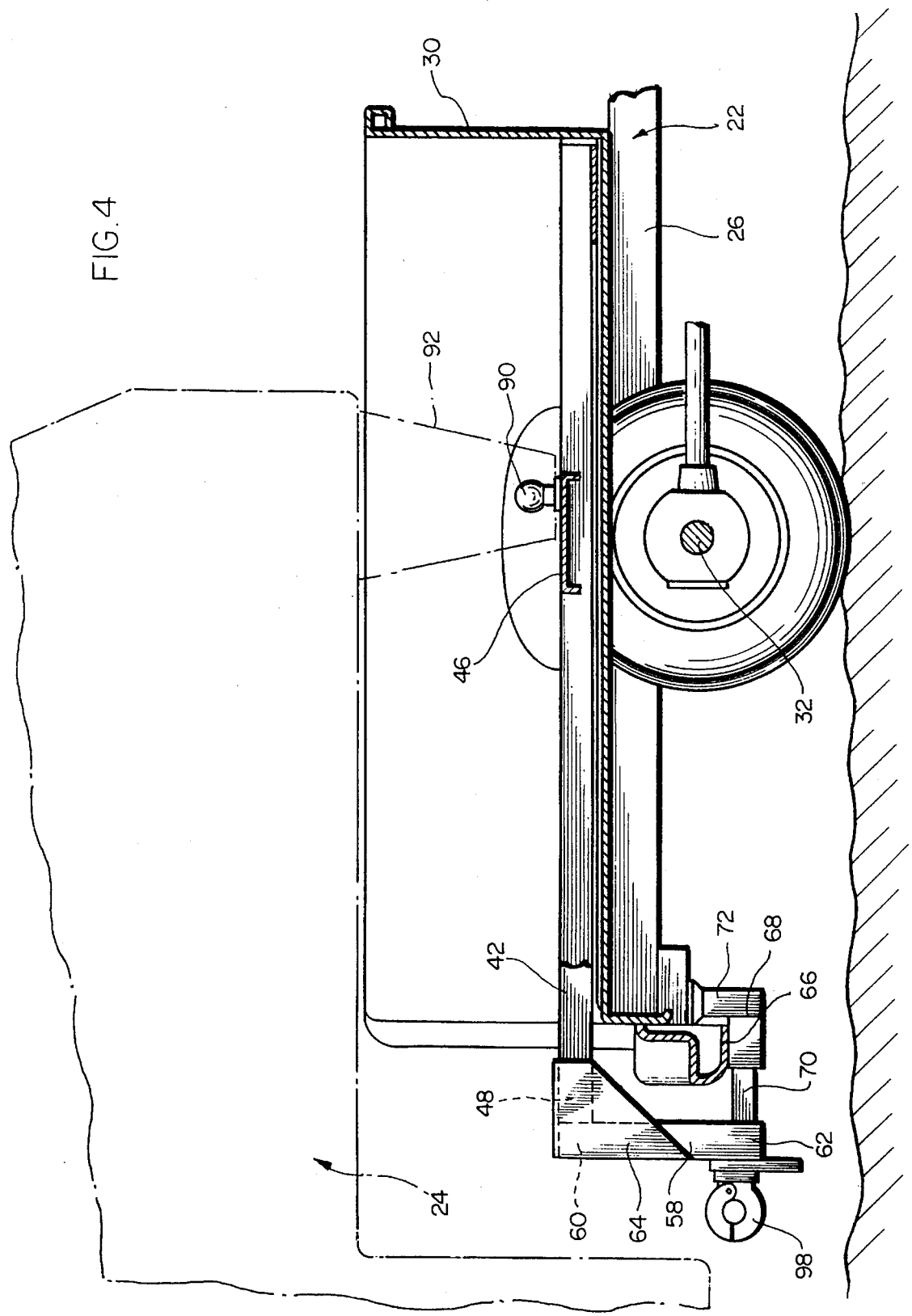
FIG. 4 is partial, side elevational view of the pick-up truck with the trailer attached thereto by the novel carrier hitch of the present invention along line 4—4 of FIG. 3.

When the carrier hitch 20 is attached to the truck frame 26 by means described herein, the first and second main beams 42, 44, the cross member 46 and the frame mounting member 52 lie on the bed 30 of the truck 22. The frame mounting member 52 is attached to the bed 30 of the truck 22 by means described herein. The cross member 46 lies over or slightly forward of the rear axle 32 of the truck, as best illustrated in FIG. 4. The downwardly extending post member 58 extends downwardly past the bottom of the bumper 66 of the pick-up truck 22. To attach the post member 58 to the truck frame 26, the post member 58 may have a "REESE" type trailer hitch 68 attached thereto. The "REESE" type trailer hitch 68 is known in the art and is not described in detail herein. Briefly, the "REESE" type trailer hitch 68 has a first member 70 and a second member 72. The first member 70 extends from the bottom end 62 of the post member 58 and under the rear bumper 66 of the truck 22. The second member 72 extends upwardly from the end of the first member 70 and engages the underside of the truck frame 26 to securely hold the rear of the carrier hitch 20 to the truck frame 26. Alternatively, the post member 58 can be directly attached to the rear bumper 66 of the pick-up truck 22. This allows for a lighter hitch assembly, and eliminates the expense of "REESE" type hitch.

To attach the novel carrier hitch 20 of the present invention to the frame 26 of the pick-up truck 22, the frame mounting member 52 has threaded holes 74 therethrough to which a clamp structure 76 is connected. The frame mounting member 52 has a threaded hole 74 on each end of the member 52 to which a clamp structure 76 is attached. The clamp structure 76 includes a bracket member 78 which has a threaded hole 80 therethrough along the length of the bracket member 78. A bolt 82, which can be threaded along its entire length or only threaded at each end of the bolt 82, is attached to the bracket member 78 by threading an end of the bolt 82 into the threaded hole 80 in the bracket member 78. The opposite end of the bolt 82 is threaded into the threaded hole 74 in the frame mounting member 52 until a portion of the end of the bolt 82 extends upwardly from the top surface of the frame mounting member 52. To secure the frame mounting member 52 and the bolt 82 together, suitable means are employed. For example, a washer 84 can be placed over the end of the bolt 82 which extends upwardly from the frame mounting member 52 so that the washer 84 lies flat against the top surface of the frame mounting member 52. Thereafter, a nut 86 can be threaded onto the end of the bolt 82 until the nut 86 abuts snugly against the washer 84. Similar structure can be employed to secure the bottom end of the bolt 82 and the bracket member 78 together, if desired.

When the carrier hitch 20 is attached to the frame 26 of the truck 22, each bracket member 78 fits under the bed pin 40 in the respective pocket member 38. To attach the carrier hitch 20 to the truck frame 26, the nut 86 is loosened so that the clamp structure 76 is free to rotate. The clamp structure 76 is rotated so that the bracket member 78 is generally parallel to the length of the bed pin 40. The carrier hitch 20 is placed onto the bed 30 of the truck 22 such that beams 42, 44 and the members 46, 52 lie on the bed 30 of the truck 22 and each clamp structure 76 is inserted into a respective pocket 36 in the pick-up truck 22. The bracket member 78 is then rotated, by rotating the bolt 82, approximately ninety degrees so that the bracket member 78 engages the underside of the bed pin 40. Next, the nut 86 is tightened so that the bolt 82, and thus the bracket member 78, cannot rotate. The clamp structure 76 securely and firmly holds the hitch 20 against the bed 30 by forming a rigid interconnection between the truck frame 26 and the hitch 20 since the clamp structure 76, in effect, pulls on the bed pins 40 and the frame mounting member 52. Thereafter, the post member 58 is connected to the truck frame 26, by the REESE type trailer hitch 68 or by directly attaching the post member 58 to the rear bumper 66 of the truck 22, so that the rear of the hitch 20 is secured to the frame 26 and the hitch 20 cannot move.

To detach the carrier hitch 20 from the truck 22, the reverse method is carried out. The post member 58 is released from its engagement with the truck 22. The nut 86 is loosened and the bracket member 78 is rotated out from under the bed pin 40. Once the bracket member 78 is clear of the bed pin 40, the carrier hitch 20 can be easily lifted from the bed 30 of the truck 22 to completely detach the carrier hitch 20 from the pick-up truck 22. Since the pick-up truck 22 does not have to be modified so that the carrier hitch 20 can be attached, the integrity of the truck frame 26 is not compromised.

Alternatively, if pockets 36 are not provided in the bed 30 of the truck 22, an operator forms two small holes (not shown) in the bed 30 of the truck 22 by suitable means at the same positions where the pockets 36 are provided. If these small holes are used, the clamp structure 76 can be replaced by hook bolts (not shown). To attach the carrier hitch 20 to the frame 26 of the truck 22 with this attachment structure, the hook bolts are inserted under the frame 26 through the holes to clamp the carrier hitch 22 in place. To detach the hitch 20 from the truck frame 26, the hook bolts are removed from under the frame 26 through the holes and the hitch 20 is lifted off of the truck 22. Once the carrier hitch 20 is removed from the truck 22, the small holes can be sealed by suitable means, such as rubber plugs, so that all types of loads can be carried.

While the novel carrier hitch 20 of the present invention is described with the clamp structure 76 or hook bolts being attached to the frame mounting member 52, it is to be understood that the clamp structure 76 or hook bolts could also be or instead be attached to the ends of the main beams 42, 44. Also, other suitable forms of attachment means for attaching the hitch 20 to the truck frame 26 are within the scope of the invention.

If the bed 30 of the pick-up truck 22 has liner grooves 34 thereon, a plurality of elongate rods 88 may be provided on the carrier hitch 20. The rods 88 are attached to the underside of the frame mounting member 52 and extend parallel to the length of the bed 30 of the pick-up truck 22. The rods 88 are spaced apart from each other at distances which correspond to the distances between the liner grooves 34 in the bed 30 of the truck 22. The rods 88 may be shaped so that they conform to the shape of the grooves 34. The rods 88 can be separate pieces which are made of suitable strong materials, such as steel and the like, and suitably attached to the underside of the frame mounting member 52, such as by welding the rods 88 to the underside of the frame mounting member 52. When the carrier hitch 20 is attached to the frame 26 of the truck 22, the rods 88 are seated within the grooves 34 and distribute the load of the trailer 22 into the bed liner grooves 34. This also prevents or minimizes distortion and prevents side-to-side movement of the carrier hitch 20 when it is attached to the pick-up truck 22.

When the carrier hitch 20 of the present invention is attached to the frame 26 of the pick-up truck 22 and a trailer 24 is attached to the hitch 20, the load of the trailer 24 is shared by three points, the first main beam 42, the second main beam 44 and the cross member 46, so that the load of the trailer 24 is distributed across the frame 26 of the truck 26. To connect the trailer 24 to the carrier hitch 20, the cross member 46 has a suitable connecting means, which may be at least one trailer attachment ball 90, mounted thereon. The attachment ball 90 may have a threaded shaft integrally attached thereto which threads into a threaded aperture in the cross member 46. One or more apertures may be provided in the cross member 46 to attach the ball 90 thereto. As shown in FIG. 2, the cross member 46 has a forward aperture 94 and a rearward aperture 96 therethrough. If a single trailer attachment ball 90 is used, the ball 90 can be moved from the forward aperture 94 to the rearward aperture 96 to provide the ability to position the trailer load in different locations relative to the pick-up frame 26. Alternatively, two balls can be attached to the cross member 46 if desired. The trailer 22 has a suitable interconnection device 92 thereon to attach the trailer 22 to the attachment ball 90. Since the trailer 24 is attached to the bed 30 of the pick-up truck 22 over or slightly forward of the rear or drive axle 32 of the truck 22, since the cross member 46 is positioned over or slightly ahead of the rear axle 32 of the truck 22, this allows the weight of the pulled trailer load to be more evenly distributed over the wheels of the pick-up truck 22.

In addition, a suitable attachment hitch 98 for pulling a load behind the truck 22 can be mounted on the post member 58 if desired. Furthermore, adjustable "wing" brackets (not shown) can be provided on the frame mounting member 52. The wing brackets can be used to adjust sideways the width of the bed 20, and adjust up under the pick-up side overhang.

The novel carrier hitch 20 of the present invention allows the owner of the pick-up truck 22 to have full hitch capability without dismembering the pick-up truck 22 itself. The hitch 20 can be easily attached and detached from the truck 22. It also gives the flexibility of multiple hitches, and can provide for fifth wheel/king pin type, ball type or pintle type hitch combinations.

While a preferred embodiment of the present invention is shown and described, it is envisioned that those skilled in the art may devise various modifications of the present invention without departing from the spirit and scope of the appended claims.

The invention claimed is:

1. A vehicle having a frame, a bed and a rear axle beneath said frame and further having an intermediate structure and a hitch attached thereto, wherein the improvement comprises: said hitch including a frame structure for laying within said vehicle bed, said frame structure including a first main beam, a second main beam and a cross member, each said main beam having a first end and a second end, said first ends which are connected together to form an apex and said cross member extending between and being directly connected to said first and second main beams to generally form an A-shape, a first attaching structure proximate to each of said second ends of said main beams for removably attaching said main beams to the bed, a second attaching structure proximate to said first ends of said main beams for removably attaching said main beams to said intermediate structure, and said hitch including connecting means mounted on said cross member for removably connecting a trailer to said frame structure so that the vehicle and the trailer are interconnected by said hitch, said cross member being generally positioned over or slightly forward of the rear axle of said vehicle when said hitch lays within said vehicle bed and is attached to said vehicle bed and said intermediate structure so that the load of the trailer is distributed over the vehicle.

2. An improvement as defined in claim 1, wherein said connecting means comprises at least one attachment ball.

3. An improvement as defined in claim 1, wherein said first attaching structure of said hitch comprises a clamp member which clamps onto said vehicle bed when said hitch lays within said bed and which can be released therefrom to remove said hitch from said bed.

4. An improvement as defined in claim 3, further including a frame mounting member connected between said first main beam and said second main beam, said first attaching structure being connected to said frame mounting member.

5. An improvement as defined in claim 1, further including a post member attached to said first and second main beams, said post member being generally perpendicular to said first and second main beams and extending downwardly therefrom, said post member being connected to said vehicle by said intermediate member.

6. In combination, a vehicle, a hitch and an intermediate structure comprising: said vehicle comprising: a frame, a bed mounted thereon and a rear axle mounted thereunder; said intermediate structure being attached to said vehicle frame; said hitch comprising: a frame structure for laying within said vehicle bed, said frame structure including a first main beam, a second main beam and a cross member, each said main beam having a first end and a second end, said first ends connected together to form an apex and said cross member extending between and being directly connected to said first and second main beams to generally form an A-shape, a first attaching structure proximate to each of said second ends of said main beams for removably attaching said main beams to the bed, a second attaching structure proximate to said first ends of said main beams for removably attaching said main beams to said intermediate structure, and said hitch including connecting means mounted on said cross member for removably connecting a trailer to said frame structure so that the vehicle and the trailer are interconnected by said hitch, said cross member being generally positioned over or slightly forward of the rear axle of said vehicle when said hitch lays within said vehicle bed and is positioned within and attached to said vehicle bed and attached to said intermediate structure so that the load of the trailer is distributed over the vehicle.

7. The combination as defined in claim 6, wherein said connecting means of said hitch comprises at least one attachment ball.

8. The combination defined in claim 6, wherein said first attaching structure of said hitch comprises a clamp member which clamps onto said vehicle bed when said hitch lays within said bed and which can be released therefrom to remove said hitch from said bed.

9. The combination as defined in claim 8, wherein said hitch further includes a frame mounting member connected between said first main beam and said second main beam, said first attaching structure being connected to said frame mounting member.

10. The combination as defined in claim 9, wherein said bed of said vehicle has bed liner grooves and wherein said hitch further includes rods attached to an underside of said frame mounting member, said rods being seated within said bed liner grooves on the bed of said vehicle when said hitch lays within said bed of said vehicle.

11. The combination as defined in claim 6, wherein said hitch further includes a post member attached to said first and second main beams, said post member being generally perpendicular to said first and second main beams and extending downwardly therefrom, said post member being connected to said frame by said intermediate structure.

12. The combination as defined in claim 11, wherein said intermediate structure is a "REESE" trailer hitch.

* * * * *